(12) United States Patent
Monereau et al.

(10) Patent No.: US 11,857,912 B2
(45) Date of Patent: Jan. 2, 2024

(54) METHOD FOR PRODUCING A GASEOUS FLOW USING A STORAGE TANK

(71) Applicant: L'Air Liquide, Société Anonyme pour l'Etude et l'Exploitation des Procédés Georges Claude, Paris (FR)

(72) Inventors: Christian Monereau, Montpellier (FR); David Frimat, Paris (FR); Vincent Gueret, Paris (FR); Pierre Petit, Paris (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 608 days.

(21) Appl. No.: 17/044,071

(22) PCT Filed: Mar. 7, 2019

(86) PCT No.: PCT/FR2019/050513
§ 371 (c)(1),
(2) Date: Sep. 30, 2020

(87) PCT Pub. No.: WO2019/186008
PCT Pub. Date: Oct. 3, 2019

(65) Prior Publication Data
US 2021/0023498 A1    Jan. 28, 2021

(30) Foreign Application Priority Data

Mar. 30, 2018 (FR) ...................................... 1852831

(51) Int. Cl.
*B01D 53/04*    (2006.01)
*F17C 11/00*    (2006.01)
(Continued)

(52) U.S. Cl.
CPC ....... *B01D 53/047* (2013.01); *B01D 53/0462* (2013.01); *C01B 3/50* (2013.01);
(Continued)

(58) Field of Classification Search
CPC .. B01D 53/04; B01D 53/0462; B01D 53/047; B01D 2253/1126; B01D 2256/16;
(Continued)

(56) References Cited

U.S. PATENT DOCUMENTS 4,784,672 A * 11/1988 Sircar ................ B01D 53/0462
95/143
4,813,977 A *  3/1989 Schmidt ............. B01D 53/0446
95/122

(Continued)

FOREIGN PATENT DOCUMENTS

| DE | 101 10 169 | 9/2001 |
| DE | 10 2008 007 557 | 1/2009 |
| FR | 3 010 401 | 3/2015 |

OTHER PUBLICATIONS

International Search Report for corresponding PCT/FR2019/050513, dated Jul. 2, 2019.

*Primary Examiner* — Frank M Lawrence, Jr.
(74) *Attorney, Agent, or Firm* — Elwood L. Haynes

(57) ABSTRACT

A process for producing a purified gas stream having impurities, using a production unit for producing a gas stream and a storage reservoir. The process includes producing a first gas stream by means of the production unit. Storing at least a portion of the first gas stream in the storage reservoir. Extracting, from the storage reservoir, a second gas stream corresponding to at least one portion of the first stream polluted by the impurities. Purifying the second gas stream by transfer of at least one portion of the impurities contained in the second gas stream into the first gas stream. And (Continued)

recovery of the purified gas stream at the output of the purification.

12 Claims, 3 Drawing Sheets

(51) Int. Cl.
    *C01B 3/00*     (2006.01)
    *B01D 53/047*     (2006.01)
    *C01B 3/50*     (2006.01)

(52) U.S. Cl.
    CPC .... *F17C 11/005* (2013.01); *B01D 2253/1126* (2013.01); *B01D 2256/16* (2013.01); *B01D 2257/102* (2013.01); *B01D 2257/504* (2013.01); *B01D 2257/7025* (2013.01)

(58) Field of Classification Search
    CPC ........ B01D 2257/102; B01D 2257/502; B01D 2257/504; B01D 2257/7025; C01B 3/50; F17C 11/00; F17C 11/005; Y02C 20/20; Y02C 20/40; Y02P 20/156
    USPC ................................ 95/43, 90, 96, 130, 149
    See application file for complete search history.

(56) References Cited

U.S. PATENT DOCUMENTS

| | | | |
|---|---|---|---|
| 5,620,501 A | * | 4/1997 | Tamhankar .......... B01D 53/053 96/108 |
| 2001/0027724 A1 | | 10/2001 | Oshima et al. |
| 2007/0214830 A1 | | 9/2007 | Arnold et al. |
| 2013/0205997 A1 | * | 8/2013 | Sommier ............... B01D 53/02 95/1 |
| 2016/0206989 A1 | | 7/2016 | Chaise |

* cited by examiner

METHOD FOR PRODUCING A GASEOUS FLOW USING A STORAGE TANK

CROSS REFERENCE TO RELATED APPLICATIONS

This application is a 371 of International Application No. PCT/FR2019/050513, filed Mar. 7, 2019, which claims priority to French Patent Application No. 1852831, filed Mar. 30, 2018, the entire contents of which are incorporated herein by reference.

BACKGROUND

The present invention relates to a process for producing a purified gas stream using a unit for producing a gas stream and a storage reservoir.

A very large number of applications require the use of momentary gas storage. This is in particular the case each time the production or the use of a gas stream is not constant and of equal value. Town gas gasometers are an example of this. Gas production is almost continuous whereas consumption varies enormously during the day.

Wanting to keep a volume of gas for safety, for example in the event of an incident on the production unit, also leads to the use of reservoirs of more or less large size. The sudden shutdown of a furnace due to lack of oxygen could have very serious consequences for the equipment or the environment (glass furnace, incinerator, metal furnace, etc.). Sufficient storage is generally provided to allow controlled shutdown of the unit or a switch to degraded-mode operation with an emergency oxidant (air, etc.).

Necessary interruptions in the line, ranging from production to final use, also require the use of reservoirs. The distribution of pressurized gas by vehicle for example will generally require a first storage instead of loading and a second storage instead of delivery.

In the majority of cases where the stored gas is purified beforehand, that is to say that its composition is compatible with the content specification corresponding to its use, it is ensured that the reservoir does not introduce any constituents in an amount such that this implies the need to install an additional final purification. The term "reservoir" is understood to mean the entire storage/retrieval function. Indeed, any pollution of the stored gas can come from the reservoir itself, as will be shown below, but also from the ancillary equipment necessary for proper operation. It will involve instrumentation to measure for example the pressure, the temperature, the volume, used in relation to the maximum working volume (gasometer, etc.), the composition, the incoming and outgoing amounts, etc., safety devices such as valves, isolation or flow control devices (valves, valve shutters, etc.). Machines can also be part of the storage function (compressor for the gas, pump for water injection, etc.). All these elements can be the cause of the entry of pollutants, essentially atmospheric gases, for example by back diffusion.

Pollution coming from the storage itself can have different origins. This may involve the desorption of a constituent adsorbed onto the internal wall of the reservoir. Normally this type of pollution disappears after a certain period of operation but certain phenomena may require more attention to be paid to them. The impurities can for example be introduced by the feed gas itself but at a tiny content compatible with the final specification of the product. This impurity may have a tendency to adsorb onto the wall of the reservoir, in particular when the temperature of the reservoir is the coldest. Sudden heating will lead to rapid desorption and to the concentration of the impurities in the gas. Storage in a continental or desert climate can thus create momentary peaks of moisture in the gas leaving the reservoir 10 to 100 times higher than the average content, when the morning sun abruptly heats up the reservoir.

More conventionally, it may involve diffusion, through the wall, of constituents present outside the reservoir. For balloons and gasometers, this will essentially be $CO_2$ and moisture which diffuse particularly well through a majority of polymers. In underground storage, it will be possible for moisture, $CO_2$, methane, $H_2S$, etc., to be introduced depending on the local geology.

The gasometer sealing system, if it is of the type with a liquid seal, may also introduce traces of impurities (water, alcohols, etc.) depending on the nature of the fluid used. It can also introduce traces of heavy hydrocarbons if the seal is of the "grease" type.

Finally, in underground storage, it has been seen that it is possible to use a make-up fluid to help fill or extract the gas. Depending on the case, water, $CO_2$ or nitrogen can then be introduced into the gas in the reservoir.

Currently, the situation that exists is therefore one of the two shown schematically in FIG. 1.

The gas stream B extracted from the reservoir R has a content that meets the specification required for its use and is sent directly to the user U. (see FIG. 1A). This means that, taking into account the characteristics of the feed stream A, in particular its purity and its flow rate, the amount of impurities I introduced is sufficiently low for the product at the outlet to always be compatible with the specifications of the user. This is often the case for perfectly sealed storage such as, for example, a stainless steel reservoir used under pressure.

Conversely, when the gas stream B is not at the specification required for its use, an additional purification unit is used to remove the unacceptable impurities (cf. FIG. 1B). This purification can be of various type (catalysis reactor, chemical trap, unit for purification by adsorption, absorption or permeation, etc.). Such a unit will generally be expensive in terms of expenditure and in terms of operating costs and will consume gas, thus reducing the overall production yield. Indeed, in the processes most widely used for this final purification, such as adsorption, it is generally difficult to extract only the impurities, but their evacuation is, on the contrary, carried out via a residue also containing exploitable compounds.

Hence, a problem which arises is that of providing an improved production process in which pollution from the storage reservoir is limited.

SUMMARY

One solution of the present invention is a process for producing a purified gas stream B' using a unit for producing a gas stream and a storage reservoir R comprising impurities I, said process comprising the following steps:
  a) production of a gas stream A by means of the production unit,
  b) storage of at least a portion of the gas stream A in the reservoir R,
  c) extraction, from the reservoir R, of a gas stream B corresponding to at least one portion of the stream A polluted by the impurities I,
  d) purification of the gas stream B by transfer of at least one portion of the impurities I contained in the gas stream B into the gas stream A, and e) recovery of a purified gas stream B' at the output of the purification.

As appropriate, the process according to the invention can exhibit one or more of the following features:

said process comprises a step of extracting a gas stream C. This gas stream C can comprise up to all the impurities from the storage reservoir R. There should in fact be no unending accumulation of impurities i in the reservoir. In the most favorable case, there is a natural limit to the accumulation and the impurity content cannot exceed a maximum value. This is the case, for example, if the saturation of the gas phase is reached or if there is no longer any driving force to generate an impurity diffusion stream. In this hypothesis, there is theoretically no need for a purge, that is to say a second fraction exiting the reservoir R, for its part loaded with impurities i to limit the accumulation of impurities.

The opposite extreme case corresponds to a reservoir in which the stream of impurities is constant whatever the composition of the gas inside. A micro-leak of pressurized barrier gas for example can be imagined. If the stream B is completely purified, all the impurities will end up in the stream C. The ratio between the streams B and C will give the impurity content of the stream C:

the storage reservoir R is an above-ground storage reservoir or an underground storage reservoir which is natural or artificial;

the above-ground storage reservoir is a constant volume and variable pressure reservoir or a variable volume and constant pressure reservoir;

the impurities I contained in the storage reservoir R are located on the walls of said reservoir and/or in the system for sealing said reservoir and/or in additional equipment associated with the reservoir, the purification of step d) is carried out by adsorption, absorption or permeation;

the purification of step d) is carried out by adsorption by means of at least one adsorbent mass and comprises two substeps: a first substep i) comprising the co-current passage of the gas stream B through the adsorbent mass so as to remove at least one portion of the impurities I contained in the gas stream B, and a second substep ii) comprising the counter-current passage of the gas stream A through the adsorbent mass resulting from the first substep i) so as to desorb at least one portion of the impurities I;

the difference in inlet temperature between the gas streams A and B in the absorbent mass is less than 50° C., preferably less than 20° C.;

the volume flow rate of the gas stream B represents less than 90%, preferentially less than 65%, even more preferentially less than 50% of the volume flow rate of the gas stream A;

a single adsorbent mass is used in step d) and alternately undergoes passage of the gas streams A and B; and the gas stream B is batchwise so as to have no extraction of a gas stream B from the reservoir R when the adsorbent mass undergoes passage of the gas stream A;

the gas stream A is batchwise so as to have no storage of the gas stream A in the reservoir R when the adsorbent mass undergoes passage of the gas stream B;

the gas stream A comprises at least 50% hydrogen or helium and the reservoir R is an above-ground constant volume storage reservoir or an underground storage reservoir;

the gas stream A comprises at least 50% of oxygen from at least one adsorber of a unit for separating gases from air by adsorption; the gas stream B makes it possible to regenerate, preferentially to recompress, at least one adsorber of said unit for separating gases from air; and the gas stream C constitutes the oxygen-enriched production stream of said unit for separating gases from air and comprises the impurities I from the storage reservoir. Indeed, it can be seen that, in this case, the oxygen-enriched production stream comprises the impurities introduced at the level of the storage reservoir. This point will be revisited at the end of this section and then in the second example:

the purification of step d) is carried out by adsorption by means of an adsorbent mass and comprises two substeps: a first substep i) comprising the co-current passage of the gas stream B through the adsorbent mass so as to remove at least one portion of the impurities I contained in the gas stream B, and a second substep ii) comprising the passage counter-current passage of the gas stream A through the adsorbent mass resulting from the first substep i) so as to desorb at least one portion of the impurities I; with the adsorbent mass comprising activated alumina and/or silica gel and/or a zeolite;

the impurities I are essentially water and/or carbon dioxide.

It should be noted here that a few ppm (parts per million) of water or of carbon dioxide very generally have no impact when subsequently using the oxygen enriched stream. On the other hand, if these same impurities were brought into contact with the adsorbent ensuring the $O_2/N_2$ separation, in particular a zeolite such as for example a lithium-exchanged X-type zeolite, they would considerably modify its adsorption characteristics as far as rendering them ineffective for the process envisioned.

The storage reservoirs, used in the context of the invention, are of any type and any sizes. A majority are metal, made of aluminum or steel They are suitable for storing gases under a pressure generally ranging from atmospheric pressure up to several hundred bar. These may be cylinders of a few liters, with capacities of a few $m^3$ to several hundred or even thousand $m^3$. They may be spherical, cylindrical, made up of kilometers of piping, etc.

There are storage vessels made of composite materials, storage vessels made of concrete, the internal walls of which are generally covered with a coating to improve the seal, made of plastic (polymers), etc. The latter two types of reservoirs are generally reserved for low pressure storage (a few bar).

These storage reservoirs are at constant volume and gas storage/retrieval is done by pressure variation.

There are also variable volume and almost constant pressure reservoirs, in particular which are close to atmospheric pressure. Balloons and gasometers are in this family. The word gasometer will generally be used to refer to this family of variable volume storage. The volume of these reservoirs ranges from a few liters to several thousand $m^3$. Along with the town gas gasometers as already mentioned, such storage vessels exist in biogas production units, for recovering the low-pressure gases resulting from various PSAs ($CO_2$-rich gases from $CO_2$ deballasting PSAs, waste from hydrogen PSAs, etc.). There are various types of gasometers, such as column, spiral, telescopic, dry, etc., gasometers. More recently, single or double membrane gasometers have been developed. In the latter case, the outer membrane provides good resistance to the external conditions (wind, cold, heat, rain, snow, etc.), while the internal membrane is chosen for its compatibility with the gas to be stored. Smaller in size, balloons are used in particular to collect small amounts of rare gases used in various processes (helium, xenon, krypton, etc.). These gases are then recycled.

Another type of gas storage is underground reservoirs. These are generally gigantic reservoirs of several thousand $m^3$. These are either natural storage vessels (former methane reservoir, former hydrocarbon deposit, aquifer table, etc., geologically almost watertight cavities, etc.) or artificial storage vessels (former mine galleries, cavity obtained by leaching and dissolution of salt, etc.). They are used for natural gas, hydrogen and recently for helium. They are variable volume and/or variable pressure reservoirs. Indeed, another fluid can be used to repel the stored gas (nitrogen, water, etc.). The storage pressure is then between a few tens of bar and a few hundred bar.

In the case where a gas stream C is also extracted, the latter can be used as is or treated in a downstream unit as required.

Preferentially, the transfer of impurities from the stream B to the stream A is carried out by a simple process using the fact that the feed gas is free of—or contains at a lower content all—the impurities I coming from storage. The process in question will be chosen as a function of the operating conditions (pressure, temperature, flow rates, variation of these parameters over time, etc.) and of the specification of purity of the stream B with a view to its use in a downstream unit. Permeation (FIG. 2A) and/or adsorption (FIG. 2B) are perfectly suitable for carrying out this transfer. In FIG. 2A, the permeation unit 10 is of the elution type. Since the gas A is initially free from impurities I, it is theoretically possible to remove all of the impurities I from the stream B. A Teflon membrane, for example, can advantageously remove the moisture that has polluted the stream B via the reservoir. It should be noted that since the streams A and B have, except for the impurities, the same composition, there will be little or no transfer of other constituents from A to B or from B to A. This will be true for any type composition of the membrane of the permeator provided that the streams A and B are at the same pressure. Otherwise, a suitable membrane should be chosen for the permeator in order to prevent unwanted permeation of the exploited constituents. In the general case, a stream C containing the impurities will be extracted. It will be noted that this very simple solution only works if the reservoir is supplied by the stream A simultaneously with the extraction of the stream B. The weaker the stream B compared to the stream A, the more efficient the permeator will be. The impurities will be then strongly diluted in A, creating a considerable driving force for their transfer.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1A:
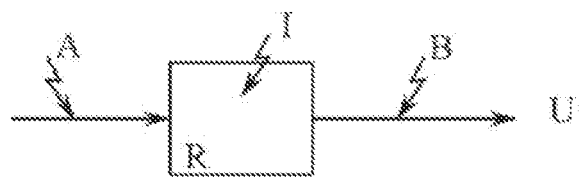
FIG. 1A is a schematic representation of one situation that is known in the art.
Figure 1B:
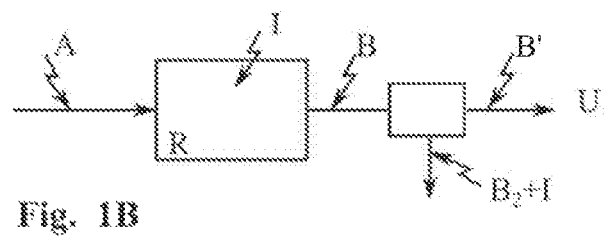
FIG. 1B is a schematic representation of another situation that is known in the art.
Figure 2A:
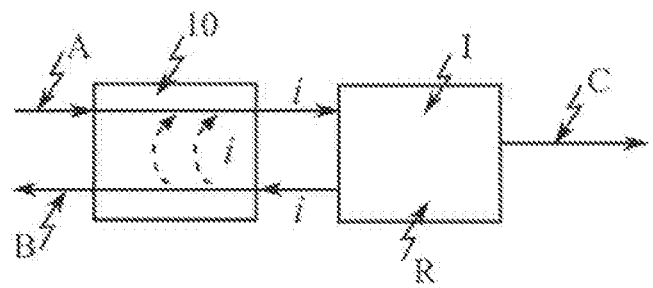
FIG. 2A is a schematic representation of the use of permeation, in accordance with one embodiment of the present invention.

The present invention will be described in more detail with the aid of FIGS. 2 to 4.

Figure 2B:
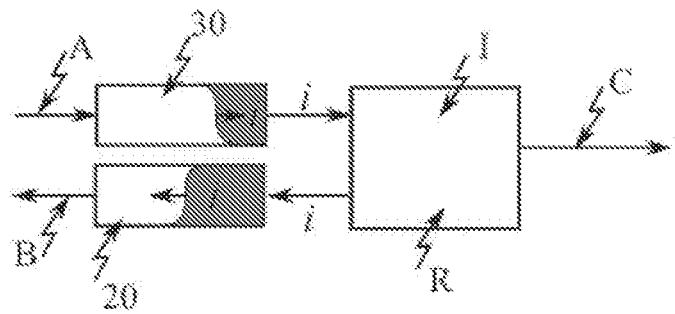
FIG. 2B is a schematic representation of the use of adsorption, in accordance with one embodiment of the present invention.
Figure 2C:
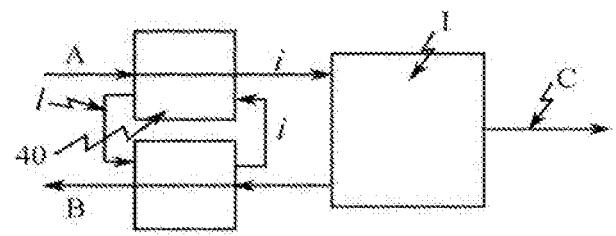
FIG. 2C is a schematic representation of the introduction into the system of the constituents used for washing, in accordance with one embodiment of the present invention.

In FIG. 2B, an adsorbent mass 20 which retains the impurities I of the stream B has been shown. Over time, the impurity front progresses towards the outlet. The stream A for its part regenerates the adsorbent mass 30 by pushing the impurities back to the reservoir. It is understood that by alternating the adsorbent masses between the streams B and A, it is possible to produce a purified stream B. Such a system no longer requires that the streams A and B be simultaneous and offers a few degrees of freedom. However, it must be possible for the stream A to be able to extract all of the impurities from the stream B stopped in the adsorbent mass. Those skilled in the art know how to determine the conditions necessary for such regeneration. At constant temperature, for example, the amount of actual $m^3$ of the stream A which is passed through the adsorbent should be greater than the amount of actual $m^3$ of the stream B passed in counter-current mode. At almost equal pressure for the two gas streams (for example reservoir pressure except for pressure drops), it would thus in theory be possible to purify a gas stream B representing approximately 90% by volume of the stream A, but in practice a lower percentage will lead to a more efficient unit.

It is also possible to use an absorption process 40, in other words a closed loop washing, the washing liquid I of the stream B being regenerated by the stream A. The latter process may have the disadvantage of introducing into the system the constituent(s) used for washing (cf. FIG. 2C).

It should be noted that the proposed process is different from a conventional purification by means of which an impurity is extracted for discharge out of the system. In this case, the impurities are transferred to the reservoir feed gas, taking advantage of the fact that it is itself free of said impurities or that it contains a small amount thereof. There is thus no loss of exploitable constituents. Another advantage may be the simplicity of implementation of the invention. Example 2 in particular illustrates this aspect of the invention.

It may seem paradoxical to reintroduce the impurities from the reservoir into the feed gas of this same reservoir, but in practice many applications are very well suited to this state of affairs. Here again, the examples will illustrate this point.

Figure 3A:
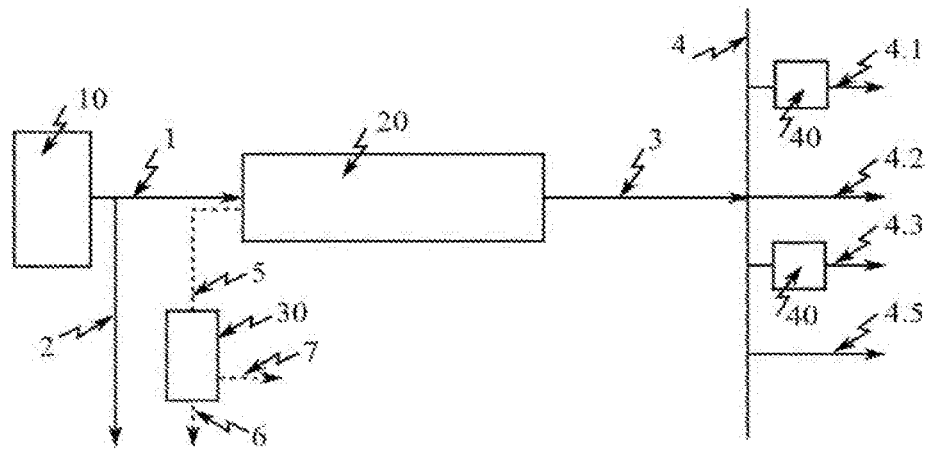
FIG. 3A is a schematic representation of a hydrogen production, storage, transport and distribution unit, in accordance with one embodiment of the present invention.
Figure 3B:
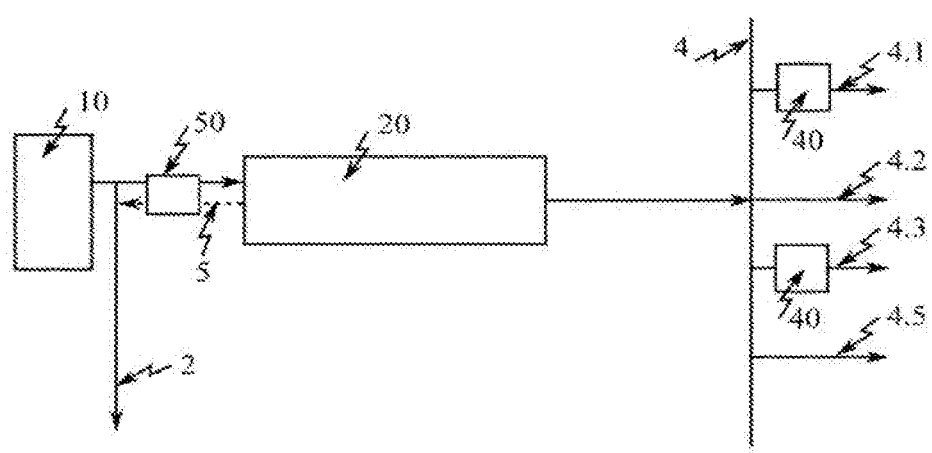
FIG. 3B is a schematic representation wherein an adsorbent mass is integrated into the path of the fluid upstream of its entry into the reservoir, in accordance with one embodiment of the present invention.

FIG. 3A schematically represents a hydrogen production, storage, transport and distribution unit. Hydrogen of 99.99 mo. % purity is produced in the unit 10. This unit 10 comprises, among other things, a steam reforming of natural gas which creates the $H_2$ molecules and a PSA which purifies this hydrogen to the desired purity. These are very conventional units well known to those skilled in the art. Depending on the production capacity required, the geographical location and the economic conditions, it would be possible for there to be other units for producing hydrogen molecules (reforming of propane, of methanol, electrolysis, etc.). Most of this purified hydrogen 1 is injected into an underground reservoir 20 created in a salt deposit. The stored volume corresponds to several weeks of consumption. A fraction 3 of the hydrogen is extracted from the reservoir and feeds a pipe 4 which serves several consumers located tens or even hundreds of kilometers away (4.1, 4.2, 4.3, 4.4, etc.). Some of these customers require extremely high purity (99.9999 mol %) and a secondary purification is then implanted just upstream of the place of consumption. It is then, for example, hydrogen used for the manufacture of electronic components. The secondary purification is then generally carried out by cryogenic adsorption at the temperature of liquid nitrogen.

In normal operation, a small amount of pure hydrogen 2, of the order of 10%, is sent directly into a local network. The purity required is in accordance with that of the production.

The reservoir 20 essentially has 2 functions. The first is to be able to average production over a long consumption period. In fact, among the various users, the hydrogen requirements are far from constant: some processes using $H_2$ are batchwise, some operate periodically at reduced load or at high load, etc. Despite all these variations, it is therefore possible to operate the unit 10 on a regular basis thus optimizing production. It is also possible to have it operate for a few weeks at nominal flow rate, that is to say under the best possible conditions, and to shut it down completely for a week. It is also possible to take advantage of preferential tariffs for energy and to temporarily stop or reduce production on demand, thereby making significant energy-cost savings.

The other function of the reservoir 20 is to have a large volume of gas in reserve to compensate for an unforeseen or programmed shutdown of the unit 10 while continuing to supply customers with hydrogen.

The reservoir 20 is essentially sealed due to the local geology, but some impurities pass from the wall to the gas. They will essentially be moisture, possibly traces of HCl, $H_2S$, $CO_2$. Depending on the geological nature of the reservoir, traces of various hydrocarbons may be found. These additional impurities in small amounts are generally acceptable for the majority of users, the purity of the product 1 generally being above the specifications required for direct use of hydrogen. In the opposite case, that is to say the need for very pure hydrogen, the additional purification 40, already provided for, is generally capable of removing the additional impurities.

On the other hand, these impurities can be troublesome for the local network 2 which is usually supplied directly with purified hydrogen and which would then periodically experience additional impurities. The conventional solution is then to use an additional purification unit 30 to treat the gas stream 5 extracted directly from the reservoir. This unit (30 in FIG. 3A) which is only used occasionally will not be of the cryogenic type because these units, while they are very safe in terms of operation, are very expensive, require special utilities. (liquid nitrogen) and do not lend themselves well to batchwise operation. The basic solution will be an adsorption purification unit, of the TSA (Temperature Swing Adsorption) type proportioned to retain the impurities and to produce a stream of hydrogen at the required specification 6. Regeneration of the adsorbent can be more or less complex depending on whether or not it is desired to limit the hydrogen losses in the purge flow 7. Such a unit will comprise 2 or 3 adsorbers, an electric or steam heater, and a valve skid to allow the cycle to proceed.

In the solution according to the invention (FIG. 3B), just an adsorbent mass 50 is integrated into the path of the fluid 1 upstream of its entry into the reservoir. This mass swept for a long time in normal operation by hydrogen stream exiting in this case the PSA will be saturated with the residual impurities present in the purified hydrogen (traces of CO, $CH_4$, $N_2$) but will be completely free of water, HCl, etc. . . . . When the production unit 10 is stopped, the network 4 will be normally supplied from the reservoir. The flow used locally will also be extracted from the reservoir 5 and will pass in the opposite direction to the stream 1 through the adsorbent mass 50. This mass will be proportioned according to the impurities present, the acceptable amounts and the expected duration of operation (duration of the downtime for maintenance for example, etc.). The amount of adsorbent will generally be greater than the amount required in the base solution described above, but the simplicity of operation, the absence of ancillary equipment and the fact that there is no loss of material mean that the latter solution has a much lower overall cost than the conventional solution. It is also safer since it does not require a succession of adsorption and desorption phases in order to operate.

Regeneration of the adsorbent mass occurs naturally when unit 10 is put back into production. The stream 1 then passes, in counter-current mode, through the various beds of adsorbents (zeolite, activated alumina, silica gel, etc.) and entrains the impurities introduced by the stream 5. As the temperature remains approximately constant and close to ambient temperature during adsorption and desorption, it is theoretically sufficient for the volume amount (actual $m^3$) of the stream 1 sent to the reservoir to be greater than that of the stream 5 in order for it to be possible for the regeneration to be carried out. In practice, a much larger volume of gas is available and the adsorbent mass will be completely regenerated and ready for the next purification of the stream 5; it will be noted that a temperature of the stream 5 lower than that of the stream 1 will promote both the stopping of the impurities and the regeneration thereof. Conversely, a lower pressure of the stream 5 may require a greater adsorbent mass. These points are known to those skilled in the art who will have no difficulty in determining the parameters required for good operation (type of adsorbent, useful mass, etc.) and there is no need here to go into more detail about the precise proportioning of the purification 50.

The second example relates to a unit for producing oxygen from atmospheric air by adsorption. More specifically, it is a VSA type unit in which the oxygen is produced at a pressure close to atmospheric pressure (1.10 bar abs) referred to as high pressure of the cycle and the regeneration is carried out by producing a vacuum of a minimum pressure, referred to as low pressure, of the order of 0.35 bar abs. There are many cycles for VSA units of this type differing by the number of adsorbers, the number of storage tanks used and by the type and/or sequence of the substeps (balancing, decompression, elution, recompression, etc.). There is no need here to go into the details regarding the unit in question. Only a few characteristics are of interest with respect to the invention.

Figure 4:
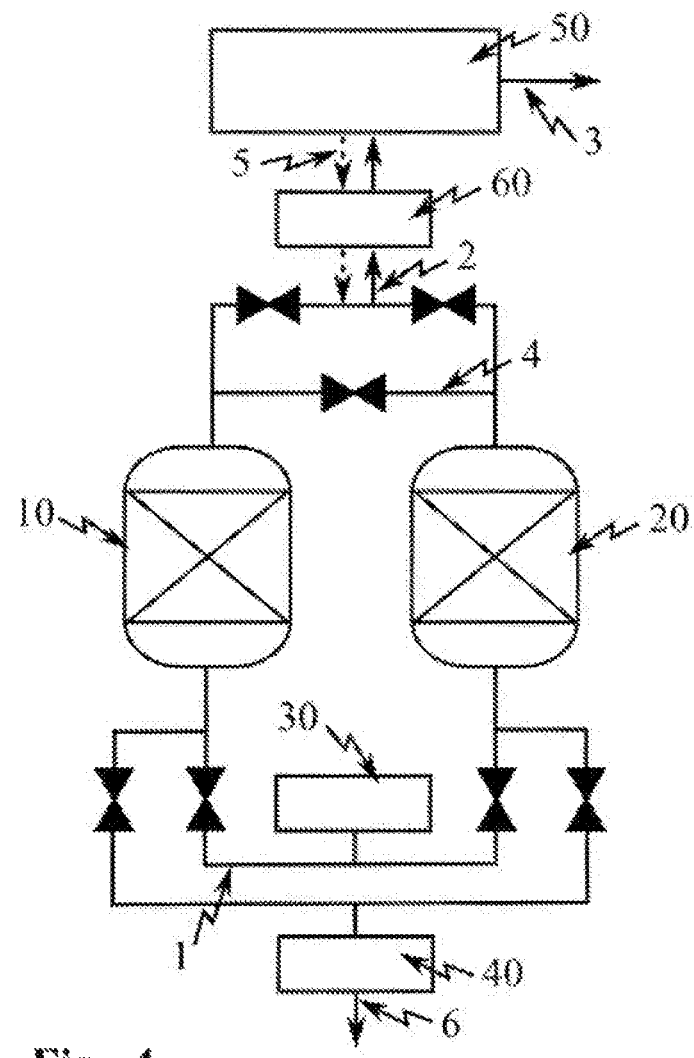
FIG. 4 is a schematic representation of an oxygen production unit, in accordance with one embodiment of the present invention.

FIG. 4 schematically shows such an oxygen production unit. It comprises 2 adsorbers marked 10 and 20 which operate in phase shift. The air 1 is introduced into the system by means of the compressor 30, in practice here of the fan type. The vacuum is created by means of the vacuum pump 40 which extracts a nitrogen-rich residue 6.

The oxygen produced by an adsorber, for example 10, and which is not immediately used for the regeneration of the other adsorber 20—stream 4 in the diagram—is sent (gas stream A which here corresponds to gas stream 2) to the storage 50 after having passed through the purification unit 60. The gas stream C (gas stream 3 in the figure), which constitutes the production of the unit, is continuously extracted at constant flow rate from the storage 50. The production of oxygen leaving the adsorber is not continuous and instead takes place over only half the "adsorption" phase. In addition, as specified above, a portion of this oxygen is taken directly to participate in the regeneration of the other adsorber. A buffer tank 50 (storage reservoir) is therefore necessary for storing the oxygen from an adsorber in order to ensure constant production. Since the oxygen is produced at a pressure barely greater than atmospheric pressure in the example selected, a very advantageous solution for the storage reservoir 50 is to use a gasometer. The pressure of the gas will then remain constant, for example 1.050 bar abs and it is the volume of the reservoir that will naturally change during the course of the cycle. This type of gasometer is conventional and inexpensive. However, since the shell is made of polymer and since said polymer is slightly permeable to water, a little atmospheric moisture will pollute the very dry oxygen produced by adsorption. In almost all applications, these traces of moisture have no impact on the downstream process and are perfectly acceptable. However, in the cycle used here, it is necessary to finish recompressing the adsorber during regeneration with oxygen during a step where the other adsorber no longer produces this oxygen. A fraction of the oxygen (stream 5=gas stream B) stored in the storage reservoir 50 should therefore be used for this purpose. It has been seen that the oxygen in the storage contained traces of moisture, of the order of 1 ppm or a few ppm. These amounts are minute but nevertheless unacceptable for the VSA. This is because this water will get trapped at the top of the adsorber on the zeolite which separates the nitrogen from the oxygen at each cycle and then after accumulation will tend to migrate toward the inlet of the adsorber following the desorption of the nitrogen.

Moisture is a poison for zeolites, most particularly for the LiLSXs developed for this application, which are very efficient but also extremely sensitive to water. This risk is such that units for the production of oxygen by adsorption operating at atmospheric pressure (of the VSA type according to the current name) generally comprise more than two adsorbers in order to be able to make the production of oxygen at the outlet of the adsorbers continuous and thus to avoid low pressure storage.

It became apparent that by placing a simple adsorbent mass 60 upstream of the storage reservoir (in the direction of production), the problem of moisture is definitely solved. The gas stream A (stream 2) passes through the adsorbent mass in counter-current mode before being stored in the storage reservoir 50. The gas stream B (stream 5) polluted by the impurities from the storage reservoir then passes through the adsorbent mass in co-current mode. The gas entering the storage reservoir and the gas extracted for recompression are at almost the same pressure and at the same temperature. The amount of gas going to the storage reservoir is much greater than the amount of gas which is extracted for recompression. It corresponds in fact to the increased production of the volume of the recompression. The adsorbent mass is therefore regenerated at each phase without difficulty. As for the humidity, it is naturally discharged with the production 3 (gas stream C).

In other cycles, the oxygen extracted from the tank can also be used to perform all or part of the elution of the adsorbent at the end of vacuum pumping. The problem is identical.

It should be noted that an adsorbent mass placed just upstream of the reservoir according to the invention does not have the same effect at all as a mass placed at the head of each adsorber. This is because, in order for an adsorber to be able to continuously produce oxygen, the regeneration power should entrain the impurities, essentially nitrogen, toward the inlet of the adsorber. It is the role of the vacuum pump to create regenerative power from the outlet to the inlet. In other words, if the adsorbent mass were placed at the head of the adsorber, there would be no possibility of entraining all of the water in the production as is the case with the principle of the invention.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A process for producing a purified gas stream comprising impurities, using a production unit for producing a gas stream and a storage reservoir, the process comprising:
    a) producing a first gas stream polluted by impurities by means of the production unit,
    b) storing at least a portion of the first gas stream in the storage reservoir,
    c) extracting, from the storage reservoir, a second gas stream comprising at least one portion of the first gas stream polluted by the impurities,
    d) purifying the second gas stream by transfer of at least one portion of the impurities contained in the second gas stream into the first gas stream, and
    e) recovery of the purified gas stream at an output of a purification unit.

2. The process as claimed in claim 1, wherein the storage reservoir is an above-ground storage reservoir or an underground storage reservoir, which is natural or artificial.

3. The process as claimed in claim 2, wherein the above-ground storage reservoir is a constant volume and variable pressure reservoir or a variable volume and constant pressure reservoir.

4. The process as claimed in claim 1, wherein the purification of step d) is carried out by adsorption, absorption or permeation.

5. The process as claimed in claim 1, wherein the purification of step d) is carried out by adsorption by means of an adsorbent mass and comprises two sub-steps:
    a first sub-step i) comprising the co-current passage of the second gas stream through the adsorbent mass so as to remove at least one portion of the impurities contained in the second gas stream, and
    a second sub-step ii) comprising the passage in counter-current mode of the first gas stream through the adsorbent mass resulting from the first sub-step i) so as to desorb at least one portion of the impurities.

6. The process as claimed in claim 5, wherein the difference in inlet temperature of the first gas stream and the second gas stream in the absorbent mass is less than 50° C.

7. The process as claimed in claim 5, wherein a volume flow rate of the second gas stream represents less than 90% of a volume flow rate of the first gas stream.

8. The process as claimed in claim 5, wherein:
a single adsorbent mass is used in step d) and alternately undergoes passage of the first gas stream and the second gas stream; and
the second gas stream is batchwise so as to have no extraction of a second gas stream in the reservoir when the adsorbent mass undergoes passage of the first gas stream.

9. The process as claimed in claim 8, wherein the first gas stream is batchwise so as to have no storage of the first gas stream in the reservoir when the adsorbent mass undergoes passage of the second gas stream.

10. The process as claimed in claim 1, wherein the first gas stream comprises at least 50% hydrogen or helium and the reservoir is an above-ground constant volume storage reservoir or an underground storage reservoir.

11. The process as claimed in claim 1, wherein the purification of step d) is carried out by adsorption by means of an adsorbent mass and comprises two sub-steps:
a first sub-step i) comprising the co-current passage of the second gas stream through the adsorbent mass so as to remove at least one portion of the impurities contained in the second gas stream, and
a second sub-step ii) comprising the passage in counter-current mode of the first gas stream through the adsorbent mass resulting from the first sub-step i) so as to desorb at least one portion of the impurities, with the adsorbent mass comprising activated alumina and/or silica gel and/or a zeolite.

12. The production process as claimed in claim 2, wherein the impurities comprise water and/or carbon dioxide.

* * * * *